United States Patent [19]
Matthews

[11] 3,939,659
[45] Feb. 24, 1976

[54] GEOTHERMAL ENERGY SYSTEM FLUID FILTER AND CONTROL APPARATUS

[75] Inventor: Hugh B. Matthews, Acton, Mass.
[73] Assignee: Sperry Rand Corporation, New York, N.Y.
[22] Filed: July 10, 1974
[21] Appl. No.: 487,109

[52] U.S. Cl. .................................. 60/641; 165/45
[51] Int. Cl.² ........................................ F03G 7/02
[58] Field of Search ...................... 60/641; 165/45

[56] References Cited
UNITED STATES PATENTS

| | | | |
|---|---|---|---|
| 2,028,471 | 1/1936 | Parent et al. ...................... | 165/45 X |
| 2,637,531 | 5/1953 | Davidson ............................ | 165/45 |
| 3,757,516 | 9/1973 | McCabe ............................. | 165/45 X |
| 3,777,502 | 12/1973 | Michie, III et al. ............... | 165/45 X |

FOREIGN PATENTS OR APPLICATIONS

| | | | |
|---|---|---|---|
| 514,673 | 12/1930 | Germany ............................ | 165/45 |

*Primary Examiner*—Martin P. Schwadron
*Assistant Examiner*—H. Burks, Sr.
*Attorney, Agent, or Firm*—Howard P. Terry

[57] ABSTRACT

A geothermal energy transfer and utilization system abstracts thermal energy stored in hot solute-bearing well water to generate super-heated steam from an injected flow of clean water; the super-heated steam is then used for operating a turbine-driven pump at the well bottom for pumping the hot solute-bearing water at high pressure and always in liquid state to the earth's surface, where it is used by transfer of its heat to a closed-loop vapor generator-turbine-alternator combination for the generation of electrical or other power. Cooled, clean water is regenerated by the surface-located system for re-injection into the deep well and the residual concentrated solute-bearing water is pumped back into the earth. The invention features filter apparatus installed within the well at the location of the vapor generator-turbine-pump apparatus for removal of solid matter from the re-injected water before its use for lubrication of turbine and pump bearings and before conversion into a working fluid for driving the deep well turbine.

9 Claims, 2 Drawing Figures

GEOTHERMAL ENERGY SYSTEM FLUID FILTER AND CONTROL APPARATUS

BACKGROUND OF THE INVENTION

1. Field of the Invention

The invention relates generally to efficient means for the generation of electrical or other power utilizing energy from geothermal sources and, more particularly, relates to arrangements including efficient super-heated steam generation and pumping equipment for long-life application in deep hot water wells for the useful transfer of thermal energy to the earth's surface.

2. Description of the Prior Art

While geothermal energy sources have been employed for the generation of power to a limited extent, generally known prior art systems operate with low efficiency and have additional disadvantages. In the few installations in which dry steam is supplied by wells at the earth's surface, the steam may be fed after removal of solid matter, from the well head directly to a turbine. On the other hand, most geothermal wells are characterized by yields of a mixture of steam and hot water along with corrosive solutes at the earth's surface, so that the water must be separated from the steam before the latter is used in a turbine.

In both kinds of installations, low pressure steam normally results, requiring the use of special turbines and yielding relatively inefficient power generation as compared to generation of power using normally operated fossil fuel or nuclear powered electrical generation equipment. Rarely do geothermal wells actually produce truly super-heated steam with only minor amounts of undesired gases and with no liquid water. The presence of significant amounts of liquid water presents problems in addition to the separation problem. If the water is only moderately hot, extraction of thermal energy from it may be expensive, or, at least, inefficient. Further, whether or not its heat content is used, the water must be handled. The water usually bears considerable concentrations of silica and of corrosive alkali salts, including chloride, sulfate, carbonate, borate, and the like ions, all of which dissolved materials present precipitation problems at the point at which any part of the water may abruptly flash into steam. If the alkaline water is allowed to escape at the installation, severe chemical and thermal pollution of streams or rivers may result. Finally, there is evidence that the removal of large amounts of water from geothermal reservoirs may lead, in a generally unpredictable manner, to undesirable land subsidence in the vicinity of thermal well installations.

A major advance in the art of extraction and use of geothermal energy is reflected in the H. B. Matthews' U.S. Pat. application Ser. No. 300,058 for a "Geothermal Energy System and Method", filed Oct. 24, 1972, issued July 23, 1974 as U.S. Pat. No. 3,824,793, and assigned to the Sperry Rand Corporation. The prior Matthews invention provides means for efficient power generation employing energy derived from geothermal sources through the generation of dry super-heated steam and the consequent operation of sub-surface equipment for pumping extremely hot well water at high pressure to the earth's surface. Clean water is injected at a first or surface station into the deep well where thermal energy stored in hot solute-bearing deep well water is used at a second or deep well station to generate super-heated steam from the clean water. The resultant dry super-heated steam is used at the well bottom for operating a turbine-driven pump for pumping the hot solute-bearing well water to the first station at the earth's surface. The water is pumped at all times and locations in the system at pressures which prevent flash steam formation. The highly energetic water is used at the surface or first station in a binary fluid system so that its thermal energy is transferred to a closed-loop surface-located vapor generator-turbine system for driving an electrical power alternator. Cooled, clean water is regenerated by the surface system and is re-injected into the well for operation of the steam turbine therein. Undesired solutes may be pumped back into the earth in the form of a concentrated brine via a separate well.

In contrast to the poor performance of prior art systems, the prior Matthews invention is characterized by high efficiency as well as by many other advantageous features. It is not limited to use with the rare dry steam sources, and it is devoid of the water and steam separation problems attached to prior art systems used with mixed steam and hot water supply wells. Since the novel power system operates with dry, highly super-heated steam, existing efficient heat transfer elements and efficient high pressure turbines may readily be employed. According to the invention, the very large calorific content of high temperature water subjected to high pressure is efficiently employed. Since high pressure liquid is used as the thermal transfer medium, undesired flash steam formation is prevented, along with its undesired attendant deposition of dissolved materials. Because the dissolved salts are efficiently pumped back deep into the earth as remotely as need be from the geothermal source, surface pollution effects are avoided and there is relatively little risk of land sinkage in the vicinity of the geothermal source.

SUMMARY OF THE INVENTION

The present invention is an improvement over that of the aforementioned Matthews patent and provides long life and efficient operation of the parts employing water re-injected into the well from the earth's surface, such as for conversion into the working fluid needed for driving the deep well turbine-driven pump and for providing a lubricating liquid in fluid bearings supporting the rotors of that turbine-pump system. The flow of clean water is unavoidably subjected to the possibility of contamination by solid matter during its recycling passage through the associated closed loop because of the effects of rust or corrosion or simply because of the unclean initial state of the system, a condition generally unavoidable because of the complex assembly and installation problems associated with it. While some such debris may be removed at the above-surface part of the loop by an ordinary filter, it is particularly desirable to provide filtration immediately before the re-injected water reaches the turbine-driven pump system so that all particles are removed from the stream that may have entered it especially from the long vertical pipe returning the reinjected water from the surface. The present invention provides such improved filtration means and additionally affords a novel surface-located arrangement for cleaning and flushing the content of the filter at the will of the operator. This event is accomplished at the earth's surface without removal of any part of the deep well installation.

DESCRIPTION OF THE PREFERRED EMBODIMENTS

Figure 1:
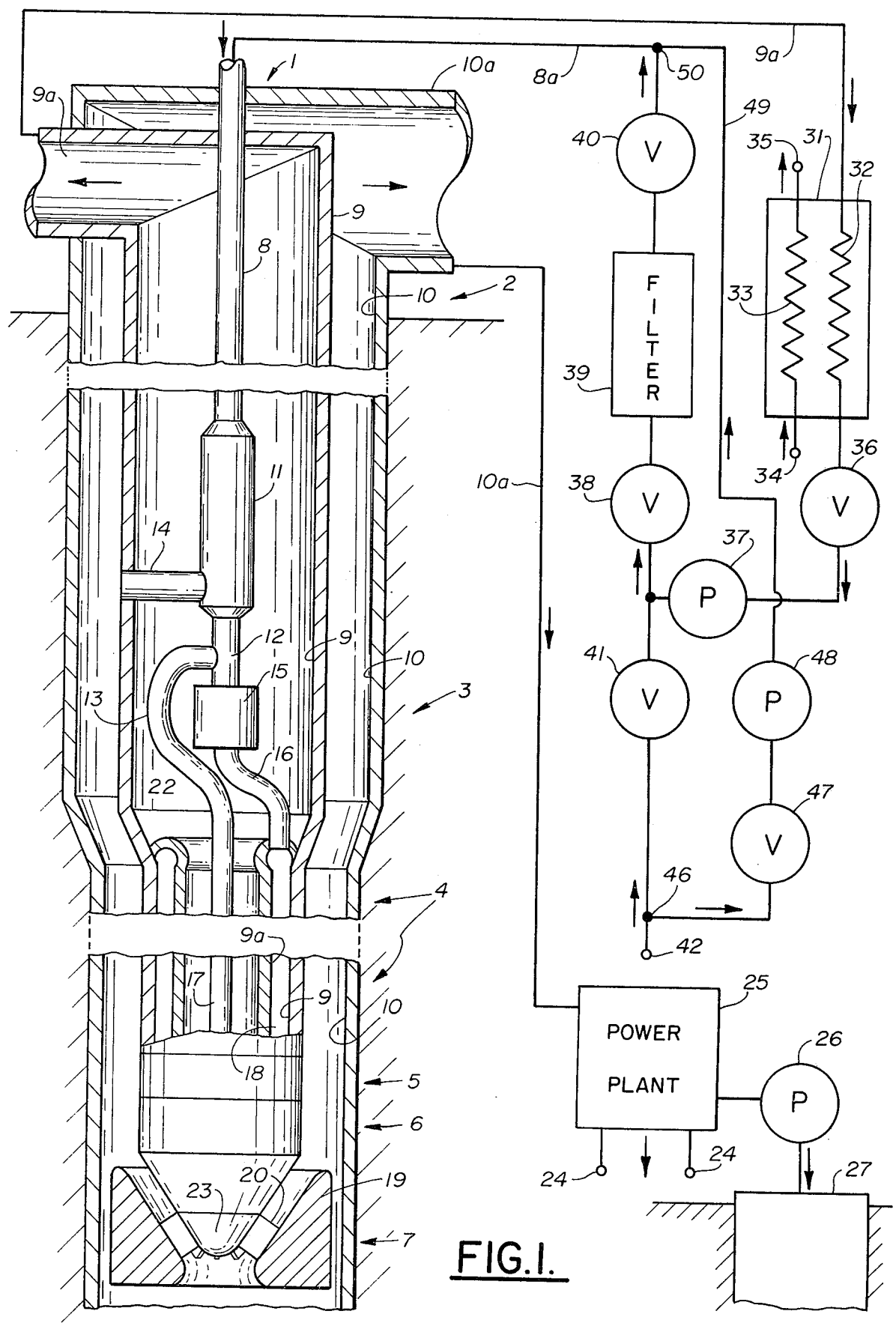
FIG. 1 is a diagramatic representation of the invention particularly illustrating apparatus located at the earth's surface and its connections to the deep well apparatus.

FIG. 1 illustrates in the left part of the drawing the general structure and characteristics of that portion of a geothermal energy extraction system which is immersed in a deep well extending into strata far below the surface of the earth, preferably being located at a depth below the surface such that a copious supply of extremely hot water under high pressure is naturally available, the active pumping structure being located adjacent the hot water source and within a generally conventional well casing pipe 10. The configuration in FIG. 1 is seen to include a well head section 1 located at the earth's surface and a main well section 2 extending far downward from well head section 1 below the earth's surface. At the subterranean source of hot, high pressure water, the main well section 2 joins a steam generator input section 3. The steam generator section 4, the steam turbine section 5, a rotary bearing section 6, and a hot water pumping section 7 follow in close cooperative succession at increasing depths.

Extending downward from the well head section 1 at the earth's surface, the well casing pipe 10 surrounds in preferably concentric relation an innermost stainless steel or other high quality alloy steel pipe or conduit means 8 for supplying a flow of relatively cool and relatively pure water at the bottom of the well for purposes yet to be explained. A second relatively large pipe or conduit 9 of similar quality and surrounding pipe 8 is also provided within well casing 10, extending from well head 1 to the energy conversion and pumping system at the bottom of the well and permitting turbine exhaust steam to flow to the surface of the earth, as will be described.

It will be seen from FIG. 1 that relatively clean and cold water is pumped down the inner pipe 8 from the earth's surface station through the novel filter 11 of the present invention. As will be described in connection with FIG. 2, filter 11 is devised to store particulate matter entering it from above, and to store it until its release is commanded. When the latter event occurs, the stored debris or sediment is flushed out of filter 11 through the generally horizontal conduit 14 into the space between pipes 9 and 10, which pipes form conduit means normally occupied by the pumped hot water. The debris very readily flows through the hot geothermal water loop or may fall back into the well itself and is thus removed from the scene of the deep well apparatus.

The filtered clean water normally leaves filter 11 and, at tee 12 is divided between two branch paths. As is described in the aforementioned Matthews patent, a first branch path feeds clean lubricating water through pipes 13 and 17 for lubricating a system of bearings within the turbine-pump system bearing section 6. The second branch path feeds clean water through pressure regulator system 15 and via distribution pipe or pipes 16 to the input manifold 22 of a steam generator 18 formed between the generally concentric walls of alloy pipes 9 and 9a. Accordingly, high pressure steam is generated and delivered to a steam turbine located within turbine section 5.

The function of the steam turbine located at section 5 and supported on bearings located within bearing section 6 is to drive a hot water pump located at pump section 7. Hot, high pressure water is thus impelled upward by the rotating pump vanes 20 between the rotating conical end 23 of the pump and an associated pump shroud 19; the hot water is pumped upward at high velocity in the annular conduit between pipes 9 and 10, thus permitting use of the thermal energy it contains at the earth's surface. More important, the hot water is pumped upward to the earth's surface at a pressure preventing it from flashing into steam and thus undesirably depositing dissolved salts at any point of incipient flashing.

Accordingly, it is seen that the extremely hot, high-pressure well water is pumped upward, flowing in the annular region defined between alloy pipes 9 and 10. Heat supplied by the hot well water readily converts the clean water flowing into manifold 22 of the steam generator 18 into highly energetic, dry, super-heated steam. The clean water, before flowing through tee junction 12 and pressure regulator 15, is at a very high pressure due to its hydrostatic head and normally also to pressure added by a surface pump yet to be discussed, so that it may not flash into steam. The pressure regulator system 15 controls the pressure of the clean water flowing therethrough so that it readily may be vaporized and superheated in the volume 18 of the steam generator. The highly energetic steam drives the deep well steam turbine and is redirected to flow upward to the earth's surface after expansion to form relatively cool steam flowing within the annular conduit defined between alloy pipes 8 and 9. Thermal energy is recovered, as will be discussed, at the earth's surface 11 primarily from the loop containing hot, high pressure water, but may also be retrieved from the turbine exhaust steam.

As described in the aforementioned Matthews patent, the hot, high pressure water within well casing 10 is fed by pipe 10a to a conventional surface thermal plant 25 which may include in the usual manner a vapor generator system in which a major part of the energy in the hot geothermal fluid is converted into high pressure vapor for driving an alternator supplying electrical energy on power lines 24, 24. The condensed fluid is pumped by pump 26 back deep into the earth via well 27. Thus, the geothermal fluid flow loop is effectively completed and fluid and dissolved mineral salts are returned into deep strata of the earth.

Still referring to FIG. 1, a closed loop for supplying and re-injecting clean water into the deep well geothermal system will next be described. The steam exhausted upwardly from the driving turbine at section 5 of that well is conveyed by pipes 9 and 9a to a heat exchanger element 32 of a conventional heat exchanger 31 and, after condensation therein, flows through the normally open valve 36. Heat exchanger 31 may be operated by supplying cooling water in a third loop including a conventional cooling tower (not shown) to pipe 34 connected through heat exchanger element 33 and output pipe 35 back to the same fluid cooling tower. Alternatively, known expedients may be employed for extraction of additional energy during the condensation process for use by power plant 25.

The clean water condensate flowing through normally open valve 36 is pumped by a conventional pump 37 back through the normally open valves 38 and 40 into pipe 8a through tee junction 50 for injection into the deep well pipe 8 at a pressure substantially above that of the pumped hot well water. Replenishment water may be supplied by opening the valve 41 from a clean water source 42. A conventional filter 39 may be interposed between the normally open valves 38 and 40.

Figure 2:
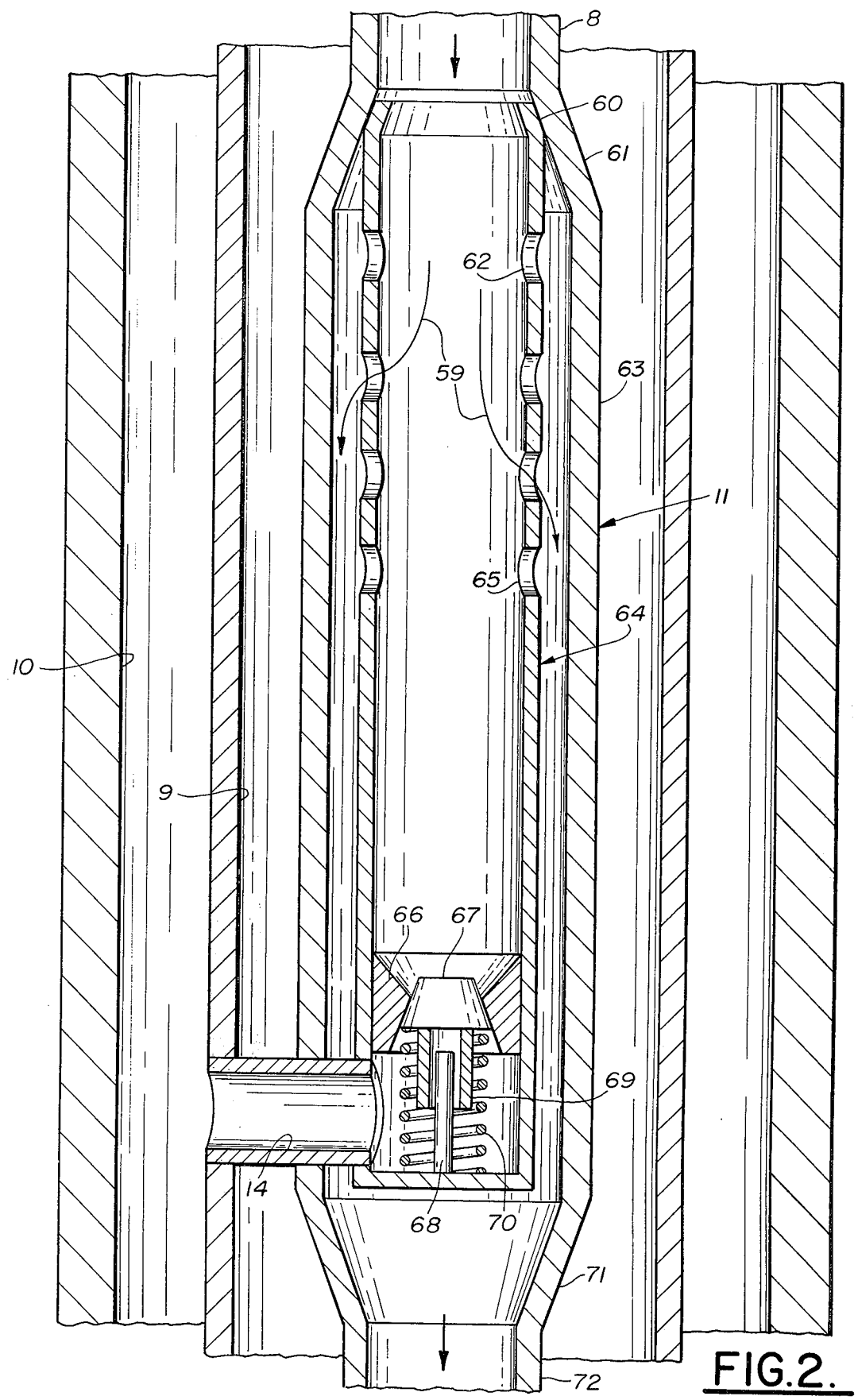
FIG. 2 is an elevation view in cross section of the novel deep geothermal well filter system.

Referring now to FIG. 2, the downwardly extending cold water input conduit means 8 is enlarged by a tapered section 61 that is in turn affixed to a downwardly extending filter casing 63 serving as the primary container for the novel filter system 11. At the end of filter casing 63, a second tapered section 71 couples the clean filtered water flow into a pipe 72 substantially of the same diameter as pipe 8, from whence the clean water may flow through the tee junction 12 of FIG. 1, as previously explained. Contained within the tapered sections 61 and 71 and the extended filter casing 63 is a multiply-apertured cavity-forming pipe 64 which actively serves as the filter element of the present invention. Cavity-forming pipe 64 is fastened as by welding, at 60 to the inner surface of the tapered section 61 and extends downward therefrom in generally concentric relation with filter casing 63. An upper portion of the filter cavity-forming pipe 64 contains a series of apertures such as aperture 62. These may be regularly spaced, if desired, though such is not strictly necessary for the practice of the invention. Nor is it necessary that all of the apertures 62 be of the same shape or dimensions. The apertures 62 serve to permit flow of the downward moving clean water from the interior of the filter cavity 64 into the space between that cavity and filter casing 63 as generally indicated by arrows 59. In this manner, the reinjected clean water stream flows on through the filter 11, pipe 72, and tee 12 to be used as previously discussed.

The cavity-forming pipe 64 is further equipped near its bottom with a differential pressure valve 57 of generally conventional nature. The armature of valve 67, being in the general shape of a frustrum of a cone, is adapted to seat itself in a conically-shaped bore in the partition 66 forming a bottom of the filter. The valve armature is urged against its seat by the spring 70, being guided by the cooperative action of pin 68 and of tubular guide 69 which slides over pin 68. The region in cavity 64 below the valve 66, 67 is sealed except for being coupled through the filter exhaust conduit 14, also shown in FIG. 1, to the space between pipe 9 and the well casing 10.

In normal operation, the armature of valve 67 of FIG. 2 remains closed and the condensate from condenser element 32 (FIG. 1) is pumped by pump 37 back into the cold water input pipe 8. Also in normal operation, the flow of the re-injected clean water through the filter 11 is indicated by the arrows 59. However, solid particles, especially the more dangerous of those that are large and therefore are usually heavy, do not tend to flow through apertures 59, but instead tend to fall directly downward into the cavity formed by filter pipe 64. By this means, such undesired particles are collected below the level 65. As is evident from the previous discussion, any accumulation of such undesired debris may be removed by the operator simply by operation of certain elements located at the earth's surface, as illustrated in FIG. 1. The operator would temporarily open valve 47 and operate high pressure pump 48 after having closed other valves in the system. By this means, very high pressure clean water is pumped from source 42 through pump 48, pipe 49, and tee junction 50 into the clean water input pipe 8. While the normally re-injected water flowing through filter 11 is at a pressure substantially above the pumped hot geothermal well water, pump 48 when operated injects clean water into pipe 8 and, therefore, into filter 11 at a higher pressure, such higher pressure forcing the armature of valve 67 downward against spring 70. Any debris collected in the interim operating period in the solid section of the cavity-forming pipe 64 below the level 65 is thereupon flushed through valve 66, 67 and pipe 14 into the hot well water. Having disposed of the accumulated debris, the operator moves the aforementioned valves in the reverse sense and the system for supplying clean water for pipe 8 reverts to normal operation.

It is seen that the invention provides a way in which an inaccessible filter in a deeply buried geothermal well may be cleaned according to a predetermined schedule without any serious interruption in the operation of the power conversion system and without dismantling any part of it. In the invention, a pressure activated valve is inserted in a passage between the up-stream side of the filter and the hot well water conduit. This valve is normally closed, thus preventing flow of clean water from the filter into the contaminated well water. When the injected water is raised to a pressure arbitrarily above that of the hot well water by action taken at the earth's surface, the filter valve opens, thereupon permitting clean water to flow from the filter into the hot well water, flushing all sediment out of the filter as it flows. When the injected water pressure is then lowered to its normal level with reference to that of the hot well water, the filter valve closes and normal operation of the geothermal apparatus resumes.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. In geothermal deep well pump apparatus located at a subterranean source of geothermal well fluid and of the kind including deep well pump means for pumping said geothermal well fluid always in liquid state for flow in cooperative energy exchanging relation with respect to a second fluid toward the earth's surface:

conduit means for conveying said second fluid from a station adjacent the earth's surface at a first pressure above the pressure of said geothermal well fluid, heat exchanger means responsive to said geothermal well fluid for converting said second fluid into a working fluid, said deep well pump means utilizing said working fluid for pumping said geothermal well fluid, and filter means normally in series flow relation with said conduit means and said heat exchanger means including cavity means having a multiply-apertured upper portion, whereby said second fluid normally flows through said multiply-apertured upper portion, while particulate matter tends to be captured in a lower portion of said cavity means.

2. Apparatus as described in claim 1 wherein said cavity means lower portion is normally impervious to flow of said second fluid.

3. In geothermal deep well pump apparatus of the kind including deep well pump means for pumping a first fluid always in liquid state for flow in cooperative energy exchanging relation with respect to a second fluid:

conduit means for conveying said second fluid from a station adjacent the earth's surface at a first pressure above the pressure of said first fluid, heat exchanger means responsive to said first fluid for converting said second fluid into a working fluid, said deep well pump means utilizing said working fluid for pumping said first fluid, and filter means normally in series flow relation with said conduit means and said heat exchanger means including cavity means having a multiply-apertured upper portion, whereby said second fluid normally flows through said multiply-apertured upper portion while particulate matter tends to be captured in a lower portion of said cavity means, said cavity means lower portion being provided at its base with normally closed valve means.

4. Apparatus as described in claim 3 wherein said normally closed valve means is spring biased to open only at a second pressure of said second fluid substantially above said first pressure.

5. Apparatus as described in claim 4 wherein the output side of said normally closed valve means is coupled by filter conduit means into a conduit for said first fluid.

6. Apparatus as described in claim 5 additionally including first control means adjacent the earth's surface for selectively providing said second fluid at said first pressure.

7. Apparatus as described in claim 6 additionally including second control means adjacent said first control means for alternatively providing said second fluid at said second pressure whereby said normally closed valve means is opened and any particulate matter collected in said cavity lower portion is flushed into said first fluid.

8. Apparatus as described in claim 7 additionally including hot water conduit means extending from said heat exchanger means to said station adjacent the earth's surface for the useful extraction of energy therefrom.

9. Apparatus as described in claim 7 additionally including vapor conduit means for conveying said working fluid, after being utilized for driving said deep well pump means, to said station adjacent the earth's surface to condensation means for generating said second fluid.

* * * * *